United States Patent Office 3,291,450
Patented Dec. 13, 1966

3,291,450
DRAG-LINE WINCH
Alfred Schlechter, Essen-Heisingen, Germany, assignor to E. Wolff G.m.b.H., Essen, Germany, a company of Germany
Filed July 7, 1964, Ser. No. 380,859
Claims priority, application Germany, Dec. 19, 1963, W 35,849
5 Claims. (Cl. 254—185)

My present invention relates to drag-line winches as used, for example, in the mining industry.

In mining operations it is common practice to dislodge exposed strata of the material to be mined by dragging a heavy vessel, or bucket, along the surface. Often the lip of the vessel coming in contact with the surface is provided with a row of teeth which serve to rake up, or loosen, the material. The equipment used for this purpose is known as a drag-line winch. It comprises the drag bucket, a cable to which the former is attached, and a motor-driven winch for reeling up the cable. Since it is necessary to handle the bucket in accordance with the load conditions acting on it, that is, since the bucket must be enabled to make frequent start-stop maneuvers to rake up the surface and must at other times be hauled in toward the winch at a steady pace, the winch is provided with a clutch adapted selectively to connect the drive means and the cable reels or reels of the winch. To avoid snapping of the control cables and to regulate the speed of the bucket it is necessary that the clutches provided in drag-line winches be able to operate for certain periods of time under conditions of slip.

Most drag-line winches now on the market utilize planetary-gear-type clutches for the aforedescribed purpose. However, it has been found that such clutches will not bear up well under the constant strain of slippage under load. In particular, insufficient heat dissipation is a cause of frequent and premature breakdown.

Other types of couplings, e.g. friction clutches, are also known for use in drag-line winches. Generally, however, these devices either suffer from overheating or, where this problem has been met by a special construction affording increased heat dissipation, are too bulky to be accommodated within the cable reel, being thus deprived of the positive seal required for protection against the dirt accumulations unavoidable in underground operations.

Accordingly, it is an object of the present invention to provide a drag-line winch not subject to the aforementioned disadvantages.

A more specific object is to provide a winch of compact proportions particularly suitable for use in subterranean operations.

A feature of my invention is the provision, in a drag-line winch having at least one cable reel, of a clutch constituted by a mechanism resembling a conventional fluid-operated automotive brake, this mechanism including a first coupling unit (e.g. a drum) on an extremity of a continuously driven shaft and a co-operating second coupling unit (e.g. a pair of spreadable brake shoes) on a carrier member which is rigid with the cable reel and extends generally transversely beyond the aforementioned shaft extremity so as to afford a convenient location for the attachment of a supply line for the operating fluid. Thus, the part of the clutch mechanism supported on the carrier member is provided with a fluid-responsive actuating element, such as a hydraulic cylinder, having an input connection at the center of the carrier member in line with the shaft axis, this connection communicating with a conduit from an external source of high-pressure fluid adapted to be selectively admitted therethrough for the establishment of frictional contact between the two coupling units against the force of a suitable restoring device such as a spring. This arrangement facilitates the admission of an actuating medium, specifically a hydraulic fluid, to the clutch mechanism without the need for using the rotating shaft itself as part of the supply system.

The carrier member, according to a more specific feature of my invention, is of cup-shaped configuration and has an apertured annular peripheral wall forming an extension of the cable reel, the perforations of this annular wall facilitating the escape of frictional heat upon slippage of the clutch mechanism embraced thereby. Where this mechanism includes a drum entrained by the continuously driven shaft, the outer cylindrical surface of that drum advantageously carries cooling fins or ribs extending into the annular clearance between this surface and the peripheral wall of the carrier member. The transverse end wall of the cup-shaped carrier member is, preferably, also perforated to promote cooling, with provision of a relatively thin, thermally conductive membrane within the cup extending across the open outer end of the drum to form therewith a substantially sealed enclosure protecting the movable elements of the clutch mechanism against dust and grime.

The arrangement set forth above is particularly suitable for use in systems with two reels mirror-symmetrically mounted on a common shaft.

The above and other objects, features and advantages of my invention will become more fully apparent from the following detailed description of certain embodiments, reference being made to the accompanying drawing in which.

Figure 1:
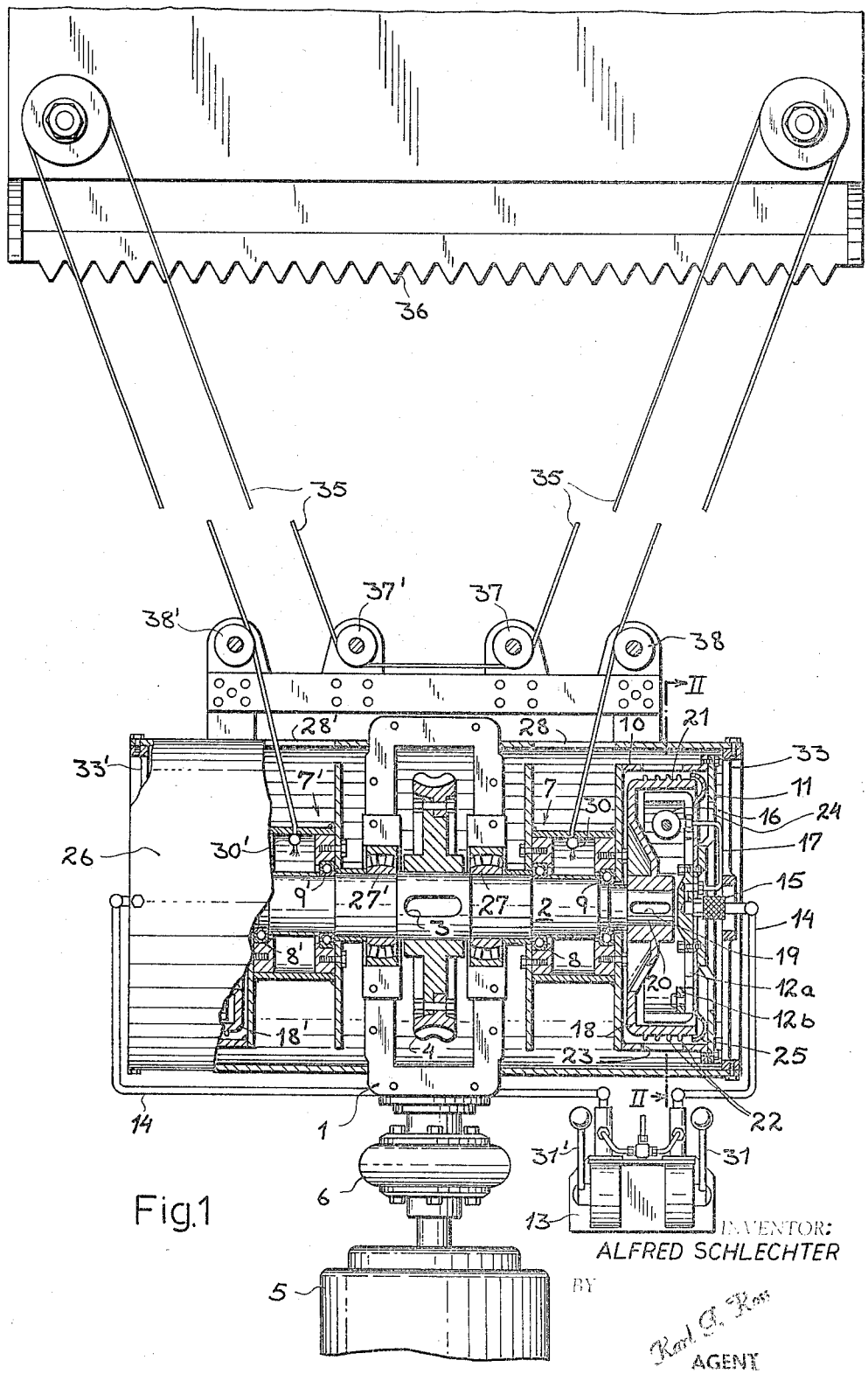
FIG. 1 is an axial sectional view of a drag-line winch according to my invention.
Figure 2:
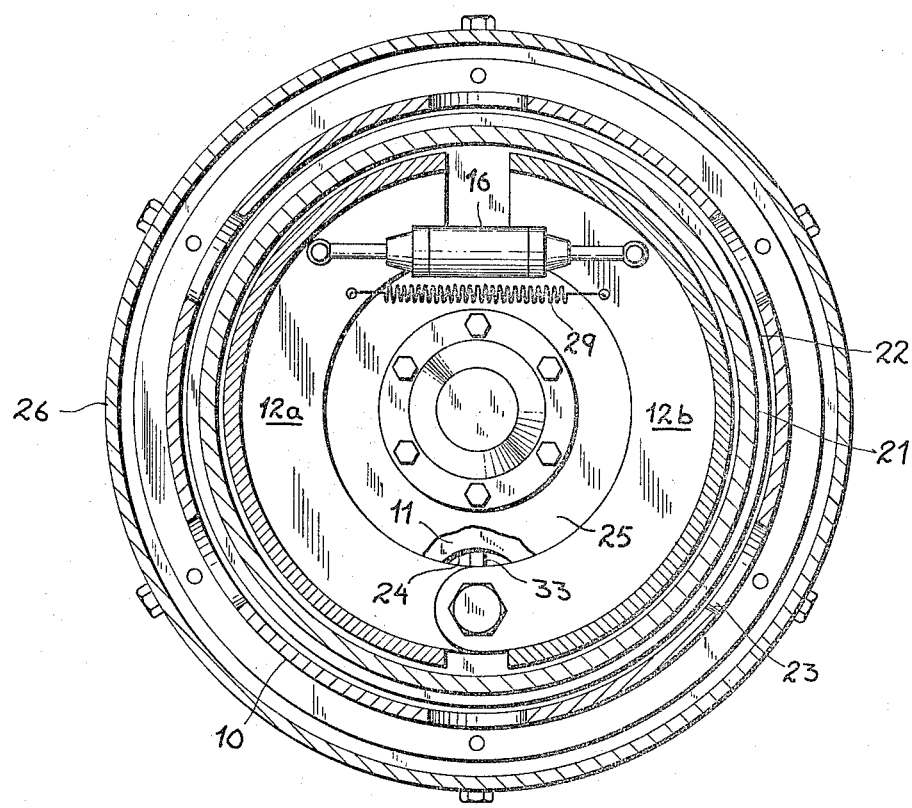
FIG. 2 is a cross-sectional view taken on line II—II of FIG. 1.

A drag-line winch embodying my invention, as illustrated in FIGS. 1 and 2, comprises a frame 1 having bearings 27, 27' in which is journaled an elongated shaft 2. Mounted on the shaft 2 at its center, by means of a keyway 3, is a worm gear 4 adapted to rotate with the shaft. The worm gear 4, and through it the shaft 2, is powered by a suitable motive source, shown as an electric motor 5 and a step-down transmission 6, acting on the centrally positioned gear 4 through a worm (not shown) in mesh therewith. Axially spaced from gear 4 and symmetrically arranged on opposite sides thereof are two cable reels 7, 7' which are mounted on the ends of shaft 2 by way of respective pairs 8, 9 and 8', 9' of ball bearings with freedom of independent rotation. These reels and their associated equipment being identical in design and operation, the following description will be limited to reel 7, it being understood that reel 7' is a mirror image thereof.

The peripheral wall of reel 7 is stepped to an annular sleeve 10 coaxial with the shaft. To the outer edge of this sleeve is secured a transverse carrier plate 11 defining an end wall of a cup-shaped member whose peripheral wall is constituted by the sleeve 10. A pair of brake shoes 12a, 12b with linings 32a, 32b are fastened to the side of the plate 11 facing the interior of sleeve 10. For purposes of actuation the shoes 12a, 12b are opertaively associated with an external hydraulic power source represented by a pump 13 (shown schematically) via a fixed supply line 14, terminating at the center of plate 11, and a rotatable distributor 15 coupled to it in fluid-tight manner, the hydraulic fluid entering a piston cylinder 16 by way of feeder line 17; the axis of cylinder 16 is skew to that of shaft 2 and reels 7, 7'.

An annular brake drum 18 coaxially surrounds an extremity 20 of shaft 2 and is secured thereto for common roation by means of a keyway 19. The cylindrical wall of drum 18 embraces the brake shoes 12a, 12b and is received within sleeve 10 with slight annular clearance. To dissipate the heat generated by the friction of the brake shoes upon their engagement with the inner surface of the peripheral wall 21, the outer surface of that wall is formed with a number of annular ribs 22 adapted to radiate heat outwardly by way of peripheral holes 23 in sleeve 10. A sheet-metal membrane 25, considerably thinner than carrier plate 11, is disposed between this plate and the open end of cylinder 21 whose periphery its crimped edge overlies with small spacing to facilitate relative rotation, thereby effectively sealing the brake mechanism against the entrance of foreign matter. Plate 11 has similar perforations 24 to promote the circulation of cooling air.

A cylindrical housing 26, rigid with frame 1, surrounds the entire brake assembly as well as the reels 7, 7' which are accessible through ports 28, 28' that enable the passage of respective lengths of cable 35 attached to these reels at 30, 30' in order to be payed out as required. The housing 26 is also open, for cooling purposes, at least at its ends which are formed by spider arms 33, 33' supporting the conduits 14, 14' from pump 13. The closed end of drum 18 is also shown perforated, at 34, for improved circulation.

In operation, motor 5 and transmission 6 maintain the shaft 2 in continuous rotation. Whereas the independently journaled reels 7, 7' are not directly affected by this movement, brake drums 18 and 18' rotate with the shaft. If the operator wishes to reel up some of the cable on reel 7 or 7' in order to bring in the associated bucket, he connects the hydraulic source 13 to conduit 14 or 14' by means of a respective control lever 31 or 31' provided thereon. Fluid now flows through, say, line 14 into the distributor 15 and from there via the feeder line 17 into the cylinder 16. The two pistons of the latter move radially outwardly and cause the brake shoes 12a, 12b to pivot about a pin 33 on plate 11 in a sense bringing them to bear upon the inner surface of drum cylinder 21 against the force of a restoring spring 29. Since the brake shoes are positively coupled with the reel 7 via their support plate 11, a frictional connection has thus been established between the shaft 2 and the reel 7 and the latter is now entrained for synchronous or lagging rotation with the shaft, depending upon the resistance encountered by a drag bucket 36 on the far end of the length of cable 35 wound about the reel. The degree of slip of reel 7 may, of course, be controlled by varying the pressure exerted on the brake shoes by the hydraulic source.

The cable 35 shown in FIG. 1 is assumed to lead to horizontally spaced points along the edge of a single drag bucket 36 adapted to be tilted or straightened out by the operator through concurrent or selective actuation of the control levers 31 and 31', the frame 1 being provided with idler rollers 37, 38 and 37', 38' to guide the several reaches of the cable. Naturally, the same dual-reel arrangement could also be used for individual control of two separate buckets hauled in from different directions by means of reels 7 and 7', respectively.

Figure 3:
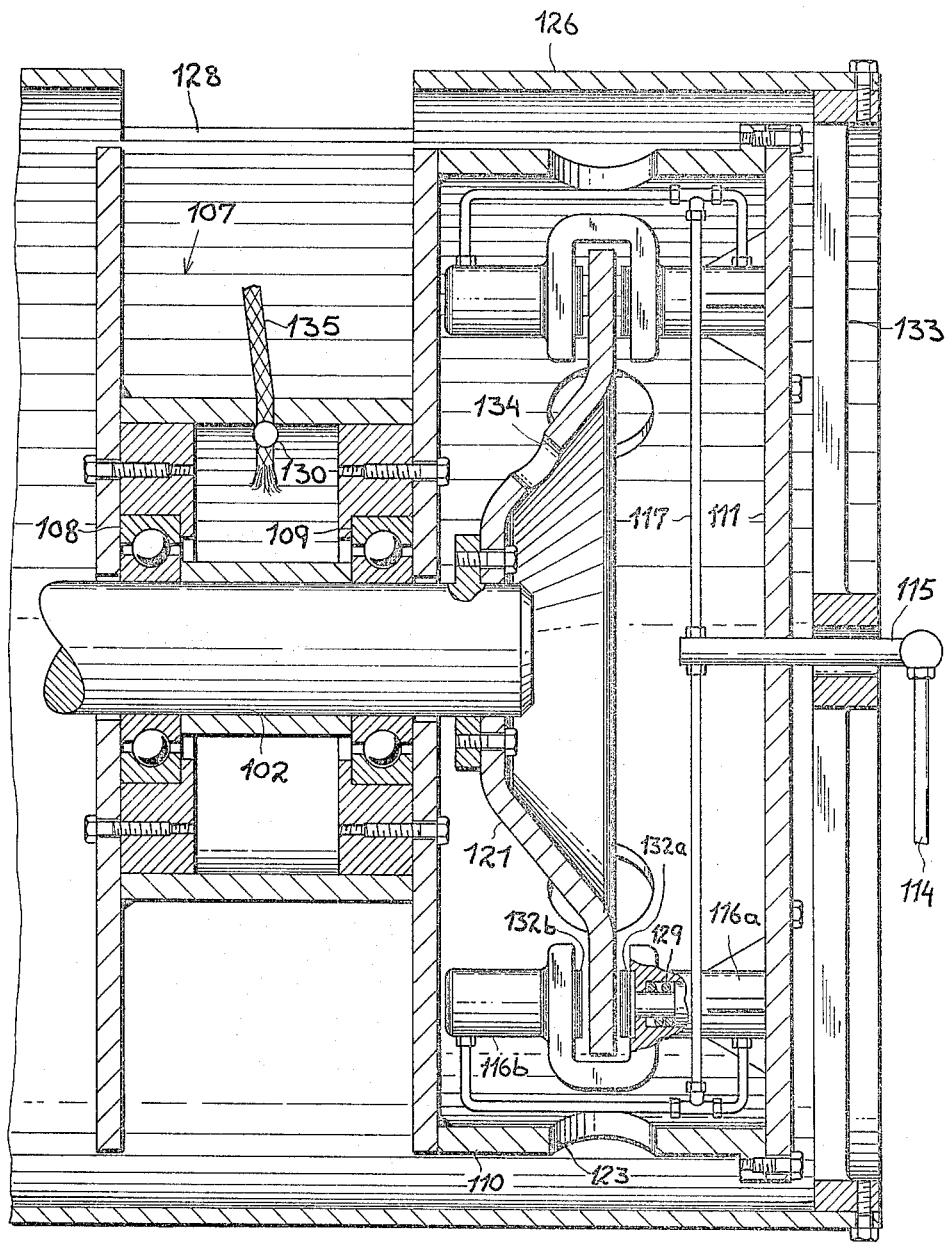
FIG. 3 is a fragmentary axial view illustrating a modification of the system of FIGS. 1 and 2.

The embodiment shown in FIG. 3 differs from that of the preceding figures solely by the construction of its clutch mechanism. Analogous elements have been designated by the same numerals preceded by a "1" in the position of the hundreds digit.

The extremity 120 of shaft 102 carries a brake disk 121 within the cup-shaped enclosure defined by sleeve 110 and end plate 111. This end plate, supporting the distributor 115 which communicates with the supply conduit 114 from a source of hydraulic fluid not shown in this figure, carries a plurality of brake-cylinder pairs 116a, 116b whose feeder lines 117 have their inlets at the distributor. The pistons of each pair of cylinders 116a, 116b face each other across the disk 121 and are normally biased by individual restoring springs 129 away from contact with the disk surface. When hydraulic fluid under pressure is admitted to distributor 115 via conduit 114 and the intervening fluid coupling, these pistons are urged toward each other so that the brake linings 132a, 132b on their confronting ends engage the disk surfaces for entrainment of the reel 107 with or without slippage. As in the preceding embodiment sleeve 110 is apertured at 123 to facilitate circulation of cooling air within housing 126.

Further modifications of the system described in conjunction with FIGS. 1 and 2 are, of course, possible without departing from the spirit and scope of my invention as defined in the appended claims.

I claim:
1. A drag-line winch comprising a frame, a shaft rotatably journaled in said frame, a pair of cable reels coaxial with said shaft and journaled on opposite ends thereof for independent rotation thereabout, a generally cup-shaped carrier member rigid with each of said reels, said member having an end wall extending generally transversely of said shaft beyond a respective extremity thereof and an apertured annular peripheral wall surrounding said extremity, a clutch mechanism for each reel including first coupling means rigid with said extremity and co-operating second coupling means supported on said end wall, said second coupling means being provided with a fluid-responsive actuating element including a hydraulic cylinder having an input connection at a location of said end wall in line with the shaft axis, a source of hydraulic fluid for said cylinder provided with a conduit terminating at said input connection, and control means individual to each reel for selectively admitting hydraulic fluid from said source to said input connection via said conduit to urge said second coupling means into frictional contact with said first coupling means, restoring means for disengaging said second coupling means from said first coupling means in the unoperated condition of said control means, and drive means between said reels for continuously rotating said shaft, said first coupling means comprises a drum with an outer cylindrical surface embraced with clearance by said peripheral wall.

2. A drag-line winch as defined in claim 1 wherein said drum is provided with cooling fins on said cylindrical surface.

3. A drag-line winch as defined in claim 1, further comprising a heat-conducting membrane within said member adjacent said end wall, said drum having an open end spanned by said membrane and forming therewith a substantially sealed enclosure for said second coupling means, said end wall being perforated for promotion of heat dissipation across said membrane.

4. A drag-line winch as defined in claim 1 wherein said second coupling means comprises a pair of brake shoes spreadable into contact with an inner cylindrical surface of said drum, said hydraulic cylinder extending skew to the shaft axis between said brake shoes.

5. A drag-line winch as defined in claim 1 wherein said end wall is provided with ventilating apertures.

References Cited by the Examiner

UNITED STATES PATENTS

| | | | |
|---|---|---|---|
| 2,497,603 | 2/1950 | Helstrom | 254—187 |
| 2,537,267 | 1/1951 | Gurries | 254—187 |
| 3,140,759 | 7/1964 | Cagle | 188—73 |

FOREIGN PATENTS 1,117,838  11/1961  Germany.

SAMUEL F. COLEMAN, *Primary Examiner.*

EVON C. BLUNK, *Examiner.*

H. C. HORNSBY, *Assistant Examiner.*